United States Patent [19]

Scott

[11] 4,303,399
[45] Dec. 1, 1981

[54] TEST SCORING CARD AND METHOD OF EMPLOYING SAME

[76] Inventor: Thaddeus L. Scott, 360 Hyde Dr., Hayward, Calif. 94544

[21] Appl. No.: 135,537

[22] Filed: Mar. 31, 1980

[51] Int. Cl.³ .............................................. G09B 7/06
[52] U.S. Cl. ..................................... 434/358; 434/363
[58] Field of Search ............ 35/48 A, 48 B; 434/353, 434/358, 363

[56] References Cited

U.S. PATENT DOCUMENTS

| | | | |
|---|---|---|---|
| 3,216,132 | 11/1965 | Flaherty et al. | 35/48 B |
| 3,410,990 | 11/1968 | Flaherty | 35/48 B |
| 3,579,868 | 5/1971 | Scott | 35/48 B |
| 3,643,348 | 2/1972 | Azure, Jr. | 35/48 B |
| 3,995,381 | 12/1976 | Manfred et al. | 35/48 A |
| 4,089,401 | 5/1978 | Scott | 400/125.1 |

*Primary Examiner*—William H. Grieb
*Attorney, Agent, or Firm*—Harris Zimmerman; Howard Cohen

[57] ABSTRACT

A light scanned, opaquely marked test scoring card and its scoring means. Machine programming is not required for scoring this card or any intermix of its test card forms. Large card numbers and test score digits are readable at fifteen feet. Two hundred test cards can be machine scored and displayed within two minutes. To prevent cheating, each student could use a different test card form. The scoring machine for these cards is smaller and less expensive than a typewriter.

5 Claims, 5 Drawing Figures

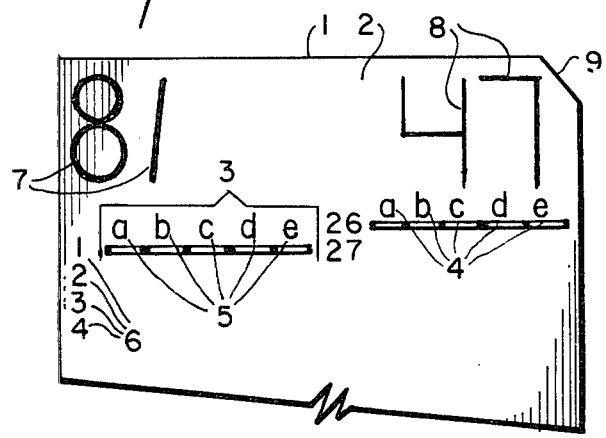
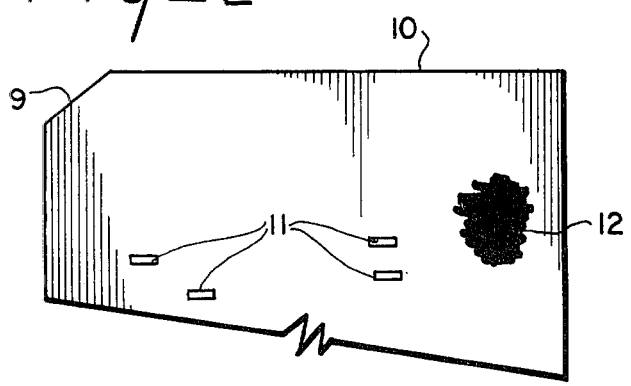
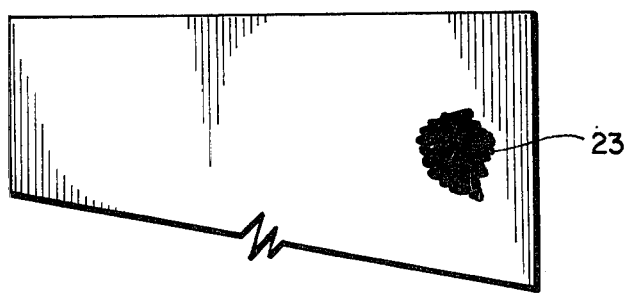

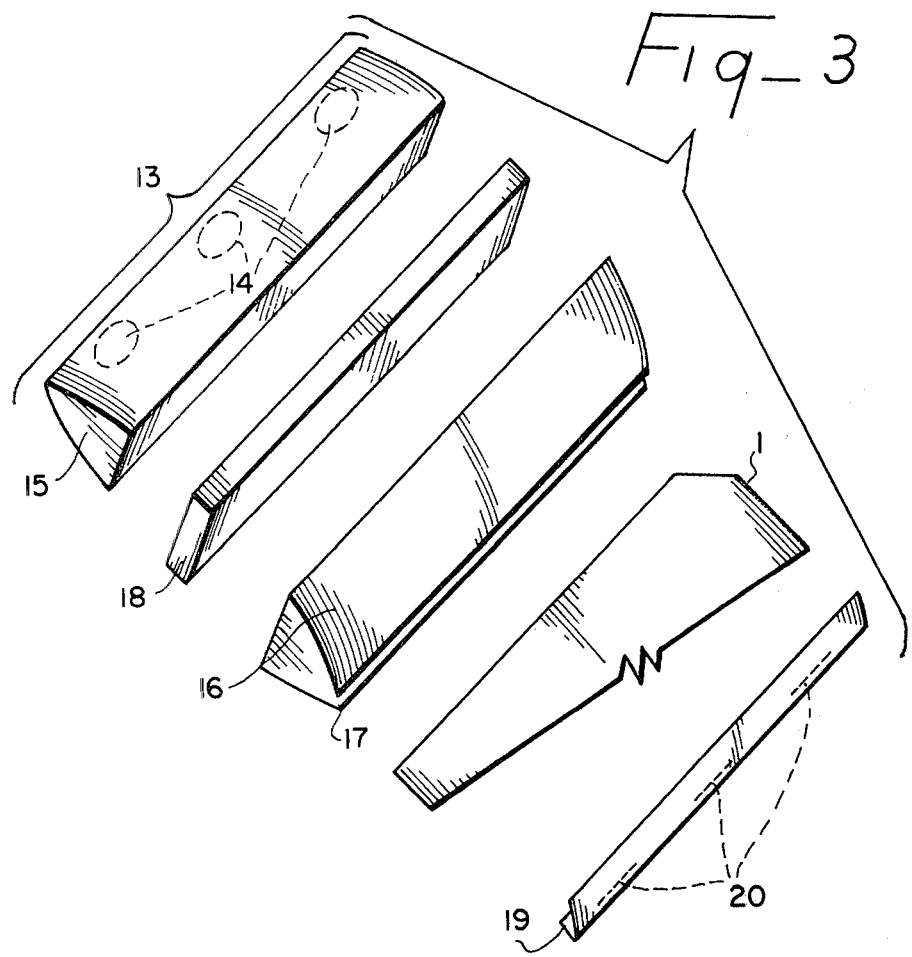
Fig_3
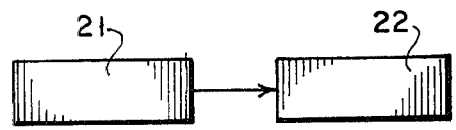
Fig_4

TEST SCORING CARD AND METHOD OF EMPLOYING SAME

BACKGROUND OF THE INVENTION

One other test scoring card, Test Scoring Answer Sheet and Method of Employing Same, U.S. Pat. No. 3,579,868, 5/19/71, by Thaddeus LeRoy Scott, does not require machine programming when scored; however, that earlier card, which is hole punch marked, has not been marketed because of manufacturing problems. A recent Segmented Printout Device, U.S. Pat. No. 4,089,401, 5/19/78, by Thaddeus LeRoy Scott, is an ideal electronic printout for this new card because this device is especially suitable for hard printing large alphanumerics.

Test scoring cards and the means to score them have been available for decades. With the exception of the unmarketed test scoring card, U.S. Pat. No. 3,579,868, all other test scoring cards require for their processing either a master scoring card and associated comparsion circuitry or complex programmed logic. Whatever the card sensing mechanism used—photoelectric, magnetic, or electrical contacts—these card processing means continue to be complex and costly. Furthermore, using such equipment presents inconveniences, insofar as that equipment must always be programmed to score the particular test card form that is used. Only a relatively few institutions have purchased test scoring machines because potential users consider such machines difficult to use and too expensive to buy. A sizeable market exists for my invention which provides the advantages of economy, convenience, rapid scoring, and high display visibility.

SUMMARY OF THE INVENTION

This new light scanned test scoring card differs from all other pen, pencil, or other marked test scoring cards in that this test card must be transparent or translucent. Light scanning takes place through this card. Furthermore, the underside of this card must be completely covered with an opaque substance except for a patterned distribution of uncovered areas. Light can pass through this card only at these uncovered areas. The test card also has distinctive, ¾ of an inch or so high, card serial numbers and, similarly sized, test score digits. In other respects, this card is quite similar to the typical test scoring card in appearance and arrangement of multiple choice, answer mark indicative areas. The means to score this test card comprise a light scanning station, an electronic down-counter, and an electronic printout. In processing, the test card passes through that station which comprises a high intensity light (or lights) source, an infra-red heat absorbing light filter, a light concentrator, and an associated light detecting device (or devices). In that station, the test card lines comprising the multiple choice answer mark indicative areas (collectively, a single group of these areas is herein defined as an answer set) are scanned a whole-line-at-a-time. Furthermore, a whole test card line contains just one such answer set. Most other test cards have test card lines that incorporate one or two answer sets; moreover, each such line has to be scanned at, usually, five or more different answer mark indicative areas. This type of multiple scanning of every test card line requires machine reprogramming whenever test card forms are changed. As stated previously, for this new test card, each test card line comprises just one answer set. That set has only one correct answer mark indicative area that must be inked, pencilled, or otherwise opaquely marked, to permit scoring the right response to an associated test question. If a scanned set has been marked wrong, a light pulse will be permitted to pass through the test card. That pulse, and all other such penetrating pulses, will be detected by an associated photoelectric device (or devices) and scored as a subtractive error from a perfect test score. In this instance, the correct answer mark indicative area would not have been inked or pencilled, and a light pulse would pass through that particular area and continue on through the card. This pulse penetration of the test card can occur because, immediately below every such correct answer mark indicative area is a corresponding uncovered area on the underside of the test card. After the electronic down-counter completes its subtractive tally, its output is fed to the electronic, segmented printout which then hard prints, in large, highly visible digits, the test score.

THE DRAWINGS

FIG. 1 is a topside view of the test scoring card of the present invention.

FIG. 2 is a bottomside view of the test scoring card of the present invention.

FIG. 3 is an exploded perspective view of the light source mechanism, the infrared light filter, the light concentrator, the testscoring card, and the light detecting devices (and their housing) for the present invention.

FIG. 4 is a block diagram representation of the electronic down-counter and the electronic printout of the present invention.

FIG. 5 is the topside view of the optional, opaque sheet that is gum, or otherwise, affixed to the bottomside of the test scoring card of the present invention.

DESCRIPTION OF THE PREFERRED EMBODIMENT

Referring to FIG. 1, there is shown the topside of the test scoring card 1 of the present invention. This card 1 provides a flat sheet 2 of translucent or transparent material having imprinted on its topside surface a plurality of sets 3 of pluralities of answer mark indicative areas 4. In the illustration, for example, each row of rectangular shaped areas opposite each Arabic number constitutes a set 3 of answer mark indicative areas 4. These sets 3 of pluralities of answer mark indicative areas 4 are longitudinally spaced in rows, each row constituting one of the sets 3 of pluralities of answer mark indicative areas 4. Each row also constitutes one line on the test card 1. When more than one column of rows is utilized, the columns are so offset with regard to each other that every set 3, or row, on the card 1 still occupies just one line on that card 1. Each set 3 of pluralities has its answer mark indicative areas 4 designated a, b, c, d, or e 5, each letter 5 indicating a selectable answer mark area 4. For each test set 3, only one letter 5 in such a letter group 5 indicates the correct answer mark area 4. Answer mark indicative areas 4 can be oval, square, rectangular or otherwise formed. The preferred embodiment uses the rectangular form.

As depicted on the illustrated test card 1, each line, set 3, or row (these terms are spacially equivalent and, hereafter, will be noted as 3) are serially numbered 6 from one to a convenient number such as 50 or 100. Each such ennumerated line 3 corresponds with an accompanying test question on a separate question sheet that has been given to the student. Positioned at the top of the illustrated card 1, in the left (or right) corner in large print is the test card serial number 7 (or numbers) of the particular test card given to the student. On the opposite test corner (left or right) is the large segmented printout 8 of the test score. The preferred positioning of the serial number 7 is in the top left card 1 position, and test scores 8 would be placed on the top right of the card 1. A small, top right corner 9 (any corner could be cut) is trimmed from the test card 1.

FIG. 2 represents the underside 10 of the test card 1 shown in FIG. 1. Except for a selected, patterned distribution of uncovered rectangular areas 11, the entire underside surface 10 is covered with an opaque ink 12 or other light blocking substance. Each of the rectangular uncovered areas 11 is positioned, in a matching fashion, directly underneath its corresponding, correct, topside rectangular answer mark indicative areas 4. There is one such uncovered underside area 11 for every topside correct answer mark indicative area 4. For example, if the entire test card 1 has been marked correctly by pen or pencil, every uncoverd area 11 on the underside of the card 10 will have been opaquely covered by a corresponding pen or pencil marked indicative area 4 and no light pulses would pass through the test card 1. A perfect test score would have been achieved. Any uncovered underside area 11 not covered on the card's 1 topside by a pen or pencil or other opaque marking in a correct answer mark area 4 permits a light pulse to be transmitted through the card 1 and to be detected and registered as a substractive error from a perfect test score.

FIG. 3 depicts, in an exploded view, the light source mechanism 13 comprised of electric lamps 14 and their housing 15, an associated light filter 18, an associated light concentrator 16 and its scanning area 17, the interposed test scoring card 1 to be scanned, and finally, the associated light detecting devices 20 in their reflective housing 19. The preferred lamps 14 (one or more could be used) are General Electric's high intensity, subminiature, low voltage, high amperage halogen type lamps, ideal for such a light source. These lamps 14 are housed in a sheet metal (or other suitable material) reflector 15 that contains and directs their rays into a reflective, bowed "V" sheet metal (or other suitable material) light concentrator 16 that, in turn, focuses those rays into the test scoring card's light scanning area 17. That area 17 has the same dimensions as the area of a whole line 3 on the test card 1. Interposed between the lamp reflector 15 and the light concentrator 16 is a transparent infrared filter 18 that removes a high percentage of the heat producing rays generated by the lamps 14. Without this kind of light filter, test cards 1 could be burned by the intense light in area 17. As the card 1 is processed, it passes through the light scanning area 17 where it is scanned a whole-line-at-a-time 3. Below area 17, in a sheet metal (or other suitable material) housing 19 are photoelectric light detection devices 20 that discern any light pulse passing through a scanned line 3 on the test card 1. Activated by light pulses, these devices 20 generate electric pulses that feed into the electronic downcounter 21, FIG. 4, that in turn actuates the electronic printout 22, FIG. 4. All electronic circuitry is conventional, available, and inexpensive. The printout 22, actuated by electronic means, effects hard printing by electromechanical means. The preferred printout is the segmented printout device, U.S. Pat. No. 4,089,401, by Thaddeus LeRoy Scott.

FIG. 5 illustrates an optional addition 23 to the test scoring card 1. This addition 23 comprises a thin, opaque card 23 (or sheet) that mates with the test card 1 and has the same dimensions as the test card 1 except that it does not employ a trimmed corner 9. This card 23 is lightly gummed (or otherwise fastened) to the underside 10 of the test scoring card 1. When this covering card 23 is removed from the test card 1, no sticky or gummed substance is left on the test card 1. The purpose of this optional addition 23 to the test card 1 is to prevent the student (or other person) from holding the test card 1 to the light and thus spot correct answer mark indicative areas 4 on the test card 1. The opaque card 23 should be removed from the test card 1 just before that card 1 is collected for scoring. This optional addition 23 increases the cost of the test card 1 only moderately. If tests are proctored satisfactorily or the honor system testing operates effectively, such an affixed opaque card 23 would not be necessary.

OTHER EMBODIMENTS

Another embodiment of this invention would employ infrared (or ultraviolet) rather than visible light for scanning the test card 1 and would substitute a visible light filter for the infrared filter 18. The test card 1, in all respects, would be unchanged except that the underside 10 (or topside 2) or the test card 1, or the composition of the test card 1 itself, would be treated to block out visible light yet would permit the passage of infrared or ultraviolet light. The uncovered areas 11 on this other embodiment would, thus, permit the passage of only infrared (or ultraviolet) light pulses through that card 1. Such a test card would not reveal correct answer mark indicative areas 4 when that card was held up to visible light.

In still another embodiment of the means for scoring the test card, the electric lamp reflector (or reflectors) 15, the bowed "V" light concentrator 16 and housing 19 of the photoelectric device (or devices) 20 could be fashioned of solid, transparent glass or plastic. The employment of solid glass or plastic would also permit a great variety of other physical shapes to guide and direct the scanning light. The possible shapes for plastic light guides and directors are innumerable, in so far as suitable plastic materials and designs can readily bend and direct light in any desired direction.

I claim:

1. A test scoring card system, comprising a flat card having an upper side and a lower side, said card being formed of a material which transmits light between said sides, an opaque layer secured to said lower side, a plurality of openings in said opaque layer disposed in a preselected patterned distribution, a plurality of sets of answer mark indicating areas disposed on said upper side, wherein one mark indicative area of each set is representative of a correct answer and is positioned in registration with a respective one of said openings to pass light through said respective opening, said card, and said one mark indicative area, and scoring means for sensing light passing through said card.

2. The test scoring card system of claim 1, further including an opaque web member releasably secured to said lower side to obscure said openings in said opaque layer.

3. The test scoring card system of claim 1, wherein said scoring means includes a light source adapted to illuminate one of said sets of answer mark indicative areas at one time, light detector means spaced apart from said light source with said card disposed therebetween, said light detector means adapted to receive illumination passing through said card, pulse means connected to said light detector means for generating an electrical pulse in response to illumination of said light detector means, counter means for counting said pulses, and display means for displaying the numerical contents of said counter means.

4. The test scoring card system of claim 3, wherein said light source includes a reflector adapted to concentrate light from said light source onto said card, comprising a generally V-shaped trough which is closed at both ends, and an infrared filter disposed between said light source and said reflector.

5. The test scoring card system of claim 1, further including means for rendering said card opaque to light in the visible spectrum and transmissive to light in the non-visible spectrum.

* * * * *